United States Patent [19]

Brinkley

[11] 4,234,486
[45] Nov. 18, 1980

[54] PROCESS FOR PREPARING METAL PHTHALOCYANINE COMPOUNDS

[75] Inventor: Robert G. Brinkley, Weston, Mass.

[73] Assignee: Polaroid Corporation, Cambridge, Mass.

[21] Appl. No.: 974,222

[22] Filed: Dec. 29, 1978

[51] Int. Cl.³ .............................................. C09B 47/24
[52] U.S. Cl. .................................................. 260/314.5
[58] Field of Search ..................................... 260/314.5

[56] References Cited

U.S. PATENT DOCUMENTS

| | | | |
|---|---|---|---|
| 3,888,875 | 6/1975 | Bader et al. | 260/314.5 |
| 3,888,876 | 6/1975 | Bader et al. | 260/314.5 |

*Primary Examiner*—John D. Randolph
*Attorney, Agent, or Firm*—Gaetano D. Maccarone

[57] ABSTRACT

There is described a novel process for preparing metal phthalocyanine compounds which can be hydrolyzed to form dye developers which are useful in photographic products and processes. Initially a metal phthalocyaninetetrasulfonyl halide intermediate is formed and a partial solvent for the intermediate is added to the reaction mixture which is then quenched in water to provide a three component emulsion. The intermediate is amidated directly without being isolated from emulsion. The final product is recovered and, in a preferred embodiment, is purified to provide a highly pure material which can be hydrolyzed to form a dye developer suitable for use in photographic products and processes such as diffusion transfer photographic products and processes.

6 Claims, No Drawings

PROCESS FOR PREPARING METAL PHTHALOCYANINE COMPOUNDS

BACKGROUND OF THE INVENTION

The invention relates generally to a process for preparing certain metal phthalocyanine compound and, more particularly to a process for preparing metal phthalocyanine compounds which can be hydrolyzed to form dye developers which are useful in photographic products and processes.

U.S. Pat. No. 3,482,972 discloses a class of metal phthalocyanine dye developers which are useful in photographic processes and products, particularly in diffusion transfer photographic processes and products. Generally, the metal phthalocyanine dye developers are prepared by initially forming the metal phthalocyanine-3,3′,3″,3‴-tetrasulfonyl halide intermediate, isolating it and then amidating it to form the desired developer. Various specific techniques for carrying out the general reaction scheme are known in the art. U.S. Pat. No. 3,888,876 teaches a process wherein the amidation step is carried out in an aqueous medium. U.S. Pat. No. 3,888,875 discloses a process wherein the amidation step is carried out in a medium which is a mixture of water and a solvent which is a solvent for the amine reactant and the final product but which is not miscible to any significant degree in water. Methylene chloride is disclosed as a preferred solvent.

In the chemical synthesis art there is continuing interest in the discovery of new techniques for the synthesis of known materials. The present application is directed to a novel process for preparing metal phthalocyanine compounds.

SUMMARY OF THE INVENTION

It is therefore the object of this invention to provide a novel process for synthesizing phthalocyanine compounds.

It is another object to provide a process for the synthesis of metal phthalocyanine compounds which are useful as dye developers in photographic products and processes.

It is a further object to provide such a process wherein initially there is formed a metal phthalocyanine-tetrasulfonyl halide intermediate which is then amidated to form the desired metal phthalocyanine compound.

Still another object is to provide a process wherein a partial solvent for the intermediate is added to the reaction mixture which is then quenched in water to form a three component emulsion and the intermediate is amidated without being isolated.

A further object is to provide such a process wherein the time period between the formation of the intermediate and the formation of the final compound is not critical.

Yet another object is to provide such a process wherein the intermediate is substantially not susceptible to hydrolysis prior to being amidated.

BRIEF SUMMARY OF THE INVENTION

These and other objects and advantages are accomplished in accordance with the invention by providing a process for synthesizing metal phthalocyanine compounds wherein a metal phthalocyaninetetrasulfonyl halide intermediate is formed and a partial solvent for the intermediate is added to the reaction mixture which is then quenched in water to provide a three component emulsion. The intermediate is amidated directly without being isolated from the emulsion. The final product is then recovered and, in a preferred embodiment, is purified to provide a highly pure material which can be hydrolyzed to form a dye developer suitable for use in photographic products and processes such as diffusion transfer photographic products and processes.

It is known in the art that the metal phthalocyaninetetrasulfonyl halide intermediates formed during the process are highly hydrolyzable in water. According to the present invention, the susceptibility of the intermediates to hydrolysis in the presence of water is substantially eliminated by the addition of the partial solvent to form the emulsion. By forming the emulsion and subsequently amidating the intermediate without isolating it, the process of the invention provides significant advantages as will be discussed in detail below herein.

DESCRIPTION OF THE PREFERRED EMBODIMENTS

The process of the present invention proceeds according to the following general reaction sequence:

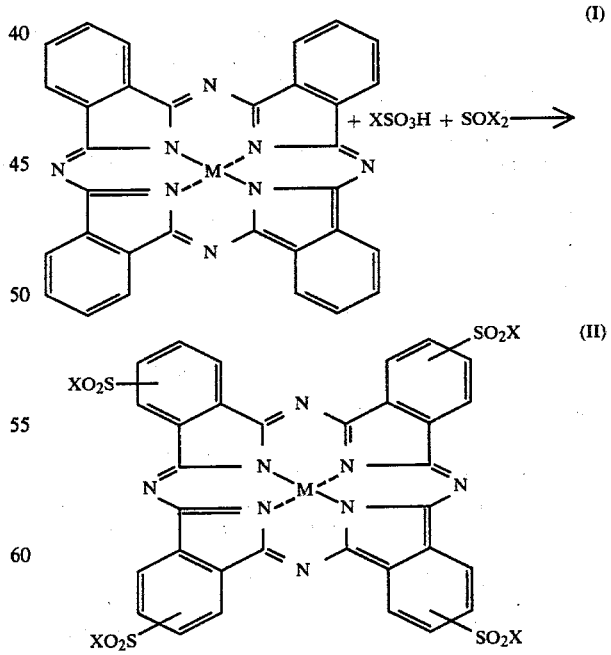

(wherein X is a halogen and M may be a metal selected from the group consisting of cobalt, nickel, copper, chromium, magnesium and zinc)

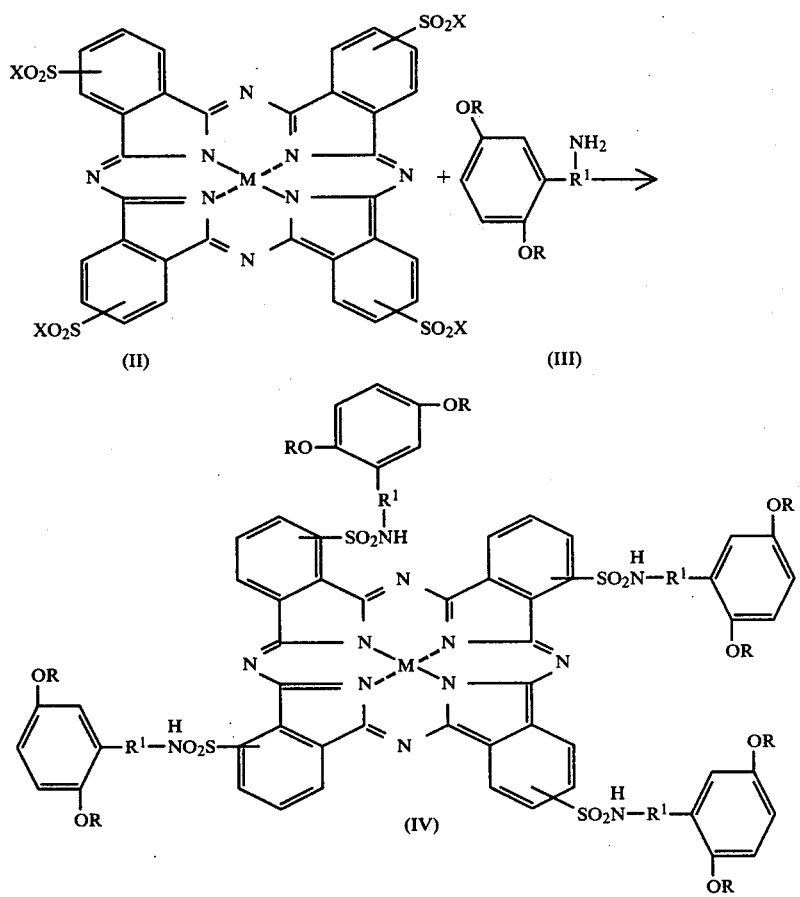

(wherein R is an alkyl radical having from 1–6 carbon atoms and $R^1$ is an alkylene radical having from 1–6 carbon atoms).

Initially the metal phthalocyanine (I), which in a preferred embodiment of the invention is copper phthalocyanine, is placed in a reaction vessel with a halosulfonic acid, preferably chlorosulfonic acid, and a thionyl halide, preferably thionyl chloride. The materials are then reacted to form the metal phthalocyanine 3,3′,3″3‴-tetrasulfonyl halide (II). To the reaction mixture there is then added a partial solvent for the metal phthalocyanine-3,3′,3″,3‴-tetrasulfonyl halide. By "partial solvent" is meant that the metal phthalocyanine-3,3′,3″,3‴-tetrasulfonyl halide is soluble in an amount of up to about 2% by weight. The partial solvent should not be miscible with water, should not be reactive with the halosulfonic acid, thionyl halide or the intermediate and should be compatible with the materials used in the subsequent reaction to form the desired final compound (IV).

Typical suitable partial solvents which may be used include, for example, methylene chloride, chloroform, 1,1,2-trichloroethane, carbon tetrachloride, nitrobenzene, chlorobenzene, nitroethane, o-dichlorobenzene, 1,3-dibromoethane, toluene, benzene, cyclohexane and ethyl acetate. Methylene chloride is preferred since it typically provides higher yields of the final product.

The reaction mixture is then quenched by adding it to water. It should be noted here that the temperature of the reaction mixture is not critical in the process of the invention in contrast to the prior art process which specified low temperatures to retard degradation of the intermediate. Moreover, by adding the partial solvent to the reaction mixture and then adding the mixture to water a potentially hazardous situation is significantly reduced.

The halosulfonic acid and thionyl halide which are present both react violently upon contact with water. However, the violence of the reaction is significantly lessened by the presence of the partial solvent because of dilution. Also, in the case of methylene chloride and chloroform, refluxing of the solvent effectively removes heat from the quenching reaction. There is thus formed a three component emulsion which includes the metal phthalocyanine-3,3′,3″,3‴-tetrasulfonyl halide, the partial solvent and water. In order to form the desired emulsion the relative amounts of partial solvent and water must be controlled. A relatively small amount of partial solvent typically causes the intermediate to separate from the emulsion whereas a relatively large amount of partial solvent typically does not result in the formation of two phases. The minimum amount of water necessary is that amount which is taken up in the emulsion. Generally there is no upper limit on the amount of water present. A typical suitable emulsion includes about 1 part by weight of the intermediate, from about 10 parts to about 18 parts by volume of methylene chloride and from 19 parts to about 25 parts by volume of water.

The emulsion may be allowed to stand thus allowing partial separation of the aqueous and solvent phases and the upper aqueous phase drawn off to leave a relatively thick, paste-like emulsion upon stirring. The emulsion may be washed several times to remove acidity and most of the excess aqueous phase drawn off. By washing several times is this manner, it is not necessary to neutralize the emulsion. Where it is desired to do so, the emulsion may be treated with a base in order to neutralize it. The quantity of base required for neutralization depends upon the efficiency with which the emulsion was washed. Typical suitable bases include, for example, triethylamine, triethanolamine, sodium hydroxide, sodium bicarbonate, potassium carbonate and the like. Triethanolamine is preferred since optimum yields have been obtained when it is used for both neutralization of the intermediate and in the subsequent step of amidation of the intermediate.

The three component emulsion which is obtained has been found to be relatively stable both chemically and physically after being washed and neutralized. An emulsion prepared and neutralized in the manner described previously and in the specific examples which are described below was allowed to stand for about 20 hours at about 25° C. before being amidated and the yield of final product was substantially equal to that obtained when the amidation was carried out immediately. These results indicate that little, if any, of the intermediate was hydrolyzed. By way of contrast it is known that the metal phthalocyaninetetrasulfonyl halides undergo rapid hydrolysis upon exposure to moisture, particularly at relatively high temperatures. Thus, in prior art processes where the intermediate tetrasulfonyl halide is isolated, it is necessary to exercise great care to minimize exposure of the intermediate to moisture and to minimize temperature effects such as by rapid handling of the intermediate at low temperatures. Thus, elaborate precautions typically have to be taken in order to prevent hydrolysis of the isolated intermediate and such precautions, particularly in the case of commercial applications, impair the overall efficiency of the prior art processes. The relative stability of the emulsion formed according to the instant process obviates the necessity for such precautions in the handling of the intermediate.

The emulsion is then combined with an amine reactant (III) and a base. The base is added since the amidation reaction proceeds in an alkaline environment. The quantity of base required is dependent upon the quantity of acid trapped in the emulsion and should be sufficient to achieve and maintain a pH of 9.5 or more. As noted previously, it is preferred, although not required, to use the same base previously used for neutralization if a base were added for this purpose. After amidation is complete, the final product is recovered. The product may be recovered by various techniques including removing the water phase, adding a solvent for the product, distilling off the methylene chloride and then recovering the product from the solvent.

The product may then be purified such as by recrystallization from a solvent in which impurities are soluble such as a binary solvent system such as acetone-ammonia or a ternary solvent system of dimethylformamide, pyridine and water. In this manner there are obtained high yields of highly pure final product (IV).

The compound can then be converted into a dye developer suitable for use in photographic products and processes. This can be done by hydrolyzing it such as reacting it with boron tribromide in a known manner to replace one or more of the R groups with hydrogen.

The invention will now be described further in detail with respect to specific preferred embodiments by way of examples, it being understood that these are intended to be illustrative only and the invention is not intended to be limited to the materials, conditions, process parameters, etc., which are recited therein. All parts and percentages are by weight unless recited therein.

EXAMPLE I

PREPARATION OF COPPER PHTHALOCYANINE-3,3'3",3"'-TETRASULFONYL CHLORIDE

To 161 g (1.38 moles) of chlorosulfonic acid there were added with stirring over a five minute period 18.0 g (0.0313 mole) of copper phthalocyanine ($\epsilon = 35,350$ at $\lambda (H_2SO_4)_{max}$ 700 m u). The mixture was heated rapidly to 140°–145° C. and stirred at that temperature for five hours. The reaction mixture was then cooled to 40°–50° C. and 56.5 g (0.475 mole) of thionyl chloride were added dropwise over a period of thirty minutes at that temperature. The temperature was raised to 80°–85° C. over a period of thirty minutes and the reaction mixture was stirred at that temperature for an additional two hours. The reaction mixture was then cooled to 5°–10° C. in an ice water bath and 250 ml of methylene chloride were added over a five minute period with little or no exotherm. The mixture was then stirred an additional five minutes.

The resulting mixture was added over a one hour period to a stirred mixture of 750 g of ice and 750 ml of water, the mixture being maintained at 0°–2° C. by the addition of ice as required. A total volume of about 2500 ml was obtained. The stirring was stopped and the water and methylene chloride phases allowed to separate. The upper aqueous phase was decanted off and the sides of the reaction vessel scraped down leaving about 600–700 ml of a relatively thick three component emulsion (a paste-like slurry).

The emulsion was washed with two 1000 ml portions of 0° C. water by stirring each time for about 10 minutes, allowing the phases to separate and then decanting the upper aqueous layer. An additional 1000 ml of 0° C. water were added and while maintaining the 0°–5° C. temperature the emulsion was neutralized by the addition of 25.6 g (0.172 mole) of triethanolamine in small portions to the stirred mixture until a pH of about 7 was maintained in the aqueous layer for five minutes. The aqueous layer was then decanted off and the emulsion used in the amidation step.

PREPARATION OF COPPER PHTHALOCYANINE-3,3',3"3"'-TETRAKIS-N-[1-(2,5-DIMETHOXYPHENYL)ISOPROPYL]SULFONAMIDE

To the above emulsion there were added 350 ml of 0° C. water, the mixture vigorously stirred and to it then added simultaneously over a five minute period 30.5 g (0.156 mole) of [1-(2,5-dimethoxyphenyl)isopropylamine] and 100 g (0.67 mole) of triethanolamine. A pH of about 9.5–10.0 was obtained. The reaction mixture was warmed to 25° C. and stirred at that temperature for four hours.

The reaction mixture was added over a one hour period to a stirred solution of 1000 ml of water and 100 ml of conc. hydrochloric acid, and heated to 80°–85° C. in a 3 liter flask fitted with a mechanical stirrer and distillation head and condenser. An additional 100 ml of methylene chloride was used to rinse equipment and then added to the flask. The mixture was flash distilled at a rate such that the temperature was maintained at 80°–85° C. The methylene chloride distilled off smoothly and the product formed as a finely divided precipitate. The mixture was filtered hot and the solid washed with water until filtrate was acid free (pH 4 or higher). The solid was dried overnight in a vacuum oven at 60° C. The crude product weighed 43.3 g.

The crude product was purified by initially adding 10 g to a stirred solution of 80 ml of dimethylformamide and 80 ml of pyridine and heating the mixture to 100° C. at which time 80 ml of about 95° C. water were slowly added while maintaining the temperature at 100° C. The solution was permitted to cool slowly to 25° C. and then refrigerated at 5° C. overnight. The mixture was filtered under vacuum with most of the solid remaining on the bottom of the flask as a semi-gummy solid.

The above product was then purified a second time as above from 180 ml of the 1:1:1 ternary solvent. After decantation and filtration as above the semi-gummy solid was dissolved in 75 ml of 1:1 dimethylformamide-–acetone solution and the solution slowly added to 750 ml of 1N hydrochloric acid with stirring. The resulting mixture was filtered under vacuum and the filter cake was washed with water until the filtrate was acid free (about one liter of water). The filter cake was dried overnight in a vacuum oven at 60° C. under 7 mm pressure. The product weight 8.5 g and contained 98.7 neutral species (by paper electrophoresis ratio). It represented a 90% recovery of neutral species and a yield of 73.4%.

EXAMPLE II

The procedure of Example I was repeated with the exception that sodium hydroxide was used to neutralize the emulsion and as the acid acceptor in the amidation step. Neutralization was effected by using 39.5 g (0.49 mole) of 49.7% sodium hydroxide solution. The amidation step required 76.0 g (0.95 mole) of 49.7% sodium hydroxide solution. The quantity of sodium hydroxide used should be enough to achieve and maintain a pH of 12 or more during the reaction. The product weighed 42.9 g (crude yield of 85.4%) and contained 88.0% neutral species (by electrophoresis ratio). This represents an estimated content yield of 75.2%. A 10 g sample of the crude product was purified as described above to give a yield of 8.05 g that contained 98.0% neutral species. This represents an 89.7% recovery of neutral species and a 73.4% yield.

EXAMPLE III

The chlorosulfonation and amidation steps were carried out as described in Example I. After the amidation reaction was complete the methylene chloride layer was separated from the aqueous layer. (This separation can be facilitated by the addition of more methylene chloride to dilute the methylene chloride layer.) The aqueous layer and equipment were then washed with 100 ml of methylene chloride which were then combined with the main methylene chloride solution.

To the solution were then added 400 ml of dimethylformamide and the solution placed in a flask fitted with a mechanical stirrer, distillation head and condenser. The mixture was distilled until the temperature of the distillate reached 152°–153° C. (the boiling range of dimethylformamide) at which point all of the methylene chloride had been removed. An additional 155 ml of dimethylformamide were added to bring the volume to 450 ml, followed by the addition of 400 ml of pyridine and the solution heated to 100° C. To the solution there were then added slowly 400 ml of preheated water while maintaining the temperature at 98°–100° C. The resulting solution was allowed to cool slowly to 25° C. and then placed in the refregerator overnight at 25° C. The mixture was filtered under vacuum with most of the solid remaining on the bottom of the flask as a semi-gummy solid.

The product was purified as described above from 900 ml of the 1:1:1 ternary solvent. The purified product weighed 36.4 g and contained 98.1% neutral species (by paper electrophoresis ratio). This represents a yield of 72.5%.

Although the invention has been described in detail with respect to various embodiments thereof, these are intended to be illustrative only and not limiting of the invention but rather those skilled in the art will recognize that modifications and variations may be made therein which are within the spirit of the invention and the scope of the appended claims.

What is claimed is:

1. A process for forming metal phthalocyanine compounds which comprises (a) reacting a compound represented by the formula:

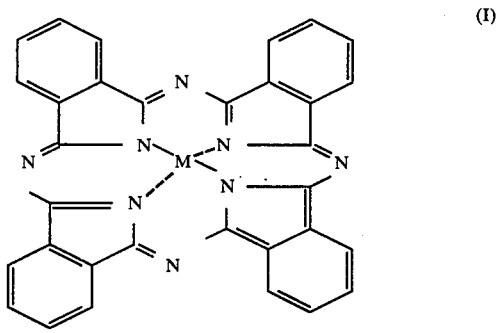

(I)

where M is a metal chosen from the group consisting of cobalt, nickel, copper, chromium, magnesium and zinc with compounds represented by the formulas:

X SO₃ H and SO X₂ where X is a halogen to form a compound represented by the formula:

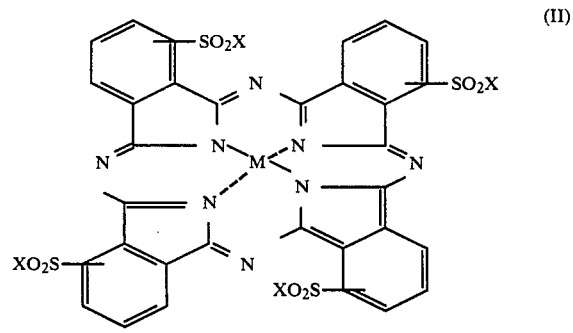

(II)

(b) without isolating compound (II) from the reaction mixture, adding a partial solvent for compound (II) and water to said reaction mixture in quantities effective to form an emulsion, wherein said partial solvent is not miscible with water; and (c) reacting compound (II) in said emulsion with a compound represented by the formula:

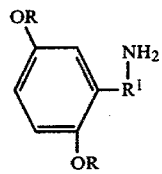

(III)

where R is alkyl having from 1 to 6 carbon atoms and R¹ is alkylene having from 1 to 6 carbon atoms to form a compound represented by the formula:

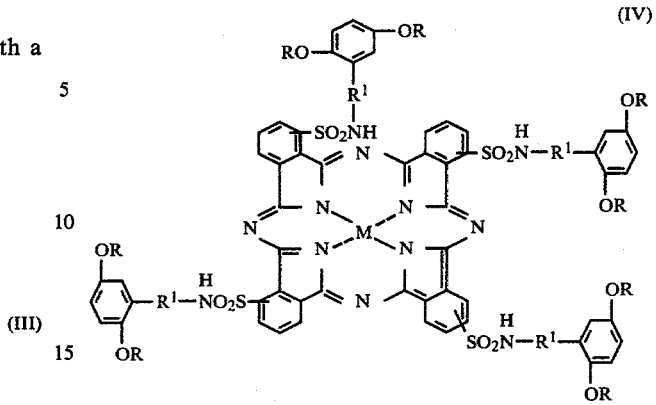

(IV)

2. The process as defined in claim 1 and further including the step of purifying compound IV.

3. The process as defined in claim 1 wherein said partial solvent is methylene chloride or chloroform.

4. The process as defined in claim 3 wherein said emulsion formed in step (b) comprises 1 part by weight of compound II to from 10 to 18 parts by volume of methylene chloride.

5. The process as defined in claim 1 wherein M is copper.

6. The process as defined in claim 1 wherein R is $CH_3$.

* * * * *